(12) United States Patent
Lee et al.

(10) Patent No.: US 11,741,862 B2
(45) Date of Patent: Aug. 29, 2023

(54) AUGMENTED REALITY WEARABLE ELECTRONIC DEVICE INCLUDING CAMERA

(71) Applicant: Samsung Electronics Co., Ltd., Gyeonggi-do (KR)

(72) Inventors: Jungkeun Lee, Gyeonggi-do (KR); Yeotak Youn, Gyeonggi-do (KR); Jina Jeon, Gyeonggi-do (KR); Byounghee Lee, Gyeonggi-do (KR); Seungnyun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 119 days.

(21) Appl. No.: 17/513,119

(22) Filed: Oct. 28, 2021

(65) Prior Publication Data
US 2022/0165189 A1    May 26, 2022

Related U.S. Application Data

(63) Continuation of application No. PCT/KR2021/014802, filed on Oct. 21, 2021.

(30) Foreign Application Priority Data

Nov. 24, 2020    (KR) .................. 10-2020-0158568

(51) Int. Cl.
*G09G 3/00*       (2006.01)
*G06F 3/01*       (2006.01)
(Continued)

(52) U.S. Cl.
CPC ......... *G09G 3/002* (2013.01); *G02B 27/0172* (2013.01); *G02B 27/0179* (2013.01);
(Continued)

(58) Field of Classification Search
CPC .......... G09G 3/002; G09G 2340/0407; G09G 2340/0464; G09G 2354/00;
(Continued)

(56) References Cited

U.S. PATENT DOCUMENTS 10,191,285 B2    1/2019    Wilson et al.
10,996,477 B2    5/2021    Yin et al.
(Continued)

FOREIGN PATENT DOCUMENTS

JP    2001-056446    2/2001
JP    2014-174510    9/2014
(Continued)

OTHER PUBLICATIONS

International Search Report dated Jan. 26, 2022 issued in counterpart application No. PCT/KR2021/014802, 11 pages.

*Primary Examiner* — Dmitriy Bolotin
(74) *Attorney, Agent, or Firm* — The Farrell Law Firm, P.C.

(57) ABSTRACT

An electronic device is provided that includes a frame, a transparent member, a leg member, a display module, a camera, and a light emitter configured to emit infrared light toward a user's eye. The electronic device also includes a lens member configured to switch between a reflective mode reflecting infrared light and a transmissive mode allowing visible light to pass. The lens member is disposed such that infrared light reflected from the user's eye to the lens member in the reflective mode is incident on the camera. The electronic device further includes a processor that controls the camera to receive visible light, which passes through the lens member in the transmissive mode, in order to generate first image information, and to receive infrared light, reflected by the lens member in the reflective mode of the lens member, in order to generate second image information.

20 Claims, 13 Drawing Sheets

(51) Int. Cl.
*G02B 27/01* (2006.01)
*H04N 23/56* (2023.01)

(52) U.S. Cl.
CPC .............. *G06F 3/013* (2013.01); *H04N 23/56* (2023.01); *G02B 2027/014* (2013.01); *G02B 2027/0138* (2013.01); *G02B 2027/0187* (2013.01); *G09G 2340/0407* (2013.01); *G09G 2340/0464* (2013.01); *G09G 2354/00* (2013.01)

(58) Field of Classification Search
CPC ............ G02B 27/0172; G02B 27/0179; G02B 2027/0138; G02B 2027/014; G02B 2027/0187; G02B 2027/0178; G02B 27/0093; G06F 3/013; G06F 3/011; G06F 3/147; H04N 23/56
See application file for complete search history.

(56) References Cited

U.S. PATENT DOCUMENTS

| | | | |
|---|---|---|---|
| 2012/0242560 A1* | 9/2012 | Nakada | G09G 3/3406 345/8 |
| 2015/0062322 A1 | 3/2015 | Gustafsson et al. | |
| 2015/0347080 A1* | 12/2015 | Shin | G06F 3/012 345/173 |
| 2015/0348327 A1 | 12/2015 | Zalewski | |
| 2016/0139039 A1* | 5/2016 | Ikehara | H04N 13/254 348/46 |
| 2016/0139411 A1* | 5/2016 | Kang | A61B 3/103 359/630 |
| 2016/0140773 A1* | 5/2016 | Yajima | G02B 27/017 345/633 |
| 2016/0188283 A1* | 6/2016 | Sendai | G02B 27/0172 345/8 |
| 2017/0010662 A1* | 1/2017 | Nishizawa | H04B 5/0031 |
| 2018/0045964 A1* | 2/2018 | Jones | G02B 27/0172 |
| 2019/0339516 A1 | 11/2019 | Zhang | |
| 2019/0339527 A1 | 11/2019 | Zhang | |
| 2020/0209949 A1* | 7/2020 | Noris | G06Q 30/0241 |
| 2020/0211251 A1* | 7/2020 | Noris | G06F 3/011 |
| 2021/0165215 A1 | 6/2021 | Haussler | |
| 2021/0181515 A1 | 6/2021 | Ellenbogen et al. | |
| 2021/0255427 A1* | 8/2021 | Liang | G02B 5/005 |

FOREIGN PATENT DOCUMENTS

| | | |
|---|---|---|
| JP | 2020-530971 | 10/2020 |
| JP | 2021-505952 | 2/2021 |
| KR | 10-1323483 | 10/2013 |
| KR | 10-2016-0111019 | 9/2016 |
| KR | 1020170023030 | 3/2017 |
| KR | 1020170118618 | 10/2017 |
| KR | 1020170141140 | 12/2017 |
| KR | 1020190101445 | 8/2019 |
| KR | 1020190104214 | 9/2019 |
| KR | 1020190105642 | 9/2019 |
| KR | 1020210065131 | 6/2021 |
| WO | WO 2017/088223 | 6/2017 |
| WO | WO 2019/110647 | 6/2019 |

* cited by examiner (a)　　　　　　　　　　(b)

AUGMENTED REALITY WEARABLE ELECTRONIC DEVICE INCLUDING CAMERA

CROSS-REFERENCE TO RELATED APPLICATION

This application is a Bypass Continuation Application of International Application No. PCT/KR2021/014802, which was filed on Oct. 21, 2021, and is based on and claims priority under 35 U.S.C. § 119 to Korean Patent Application No. 10-2020-0158568, filed on Nov. 24, 2020, in the Korean Intellectual Property Office, the disclosure of which is incorporated herein by reference in its entirety.

BACKGROUND

1. Field

The disclosure relates generally to a wearable electronic device, and more particularly, to a wearable electronic device including a camera for implementing augmented reality (AR).

2. Description of Related Art

AR may refer to technology that expresses elements generated through graphical processing and added to actual reality recognized by a user. For example, AR technology may be used to display an object existing in reality together with a virtual object including information related to the object.

AR may be implemented through various devices. Typically, AR is implemented through wearable electronic devices such as, for example, eyeglass-type wearable electronic devices or head-mounted displays (HMDs).

In order to implement AR through an eyeglass-type wearable electronic device, virtual objects may be displayed on eyeglass lenses. Images may be displayed on the lenses by projecting light onto the eyeglass lenses. For example, a projector having a very small size a micro-projector or a pico-projector) may be used. Examples of such projectors include a laser scanning display (LSD), a digital micromirror display (DMD), and a liquid crystal on silicon (LCOS) display. A transparent display may also be used to display virtual object on lenses.

In order to implement AR, an electronic device may include multiple cameras. For example, an electronic device may include a camera for capturing images in front of the electronic device, and another camera for tracking pupil movement of the user.

The increased number of cameras may increase the volume and weight of the electronic device, making the electronic device inconvenient or difficult to wear. The increased number of cameras may also increase manufacturing costs. In addition, power that is necessary to drive the multiple cameras may reduce a running time of the electronic device.

SUMMARY

An aspect of the disclosure is to provide an electronic device capable of reducing the number of cameras by integrating respective cameras that are provided to perform different functions.

In accordance with an aspect of the disclosure, an electronic device is provided, which includes a frame, a transparent member supported by the frame, a leg member rotatably connected to the frame, a display module configured to project an image onto the transparent member, a camera disposed on at least one of the frame and the leg member, and a light emitter configured to emit infrared light toward a user's eye positioned behind the frame. The electronic device also includes a lens member configured to switch between a reflective mode reflecting infrared light and a transmissive mode allowing visible light to pass, and disposed such that infrared light reflected from the user's eye to the lens member in the reflective mode is incident on the camera. The electronic device further includes a processor operatively connected to the display module and the camera. The processor is configured to control the camera to receive visible light, which passes through the lens member in the transmissive mode, in order to generate first image information, and to receive infrared light, which is reflected by the lens member in the reflective mode, in order to generate second image information.

In accordance with an aspect of the disclosure, an electronic device is provided, which includes a frame, a transparent member supported by the frame, a leg member rotatably connected to the frame, a display module configured to project an image onto the transparent member, a camera disposed on at least one of the frame and the leg member, and a light emitter configured to emit infrared light toward a user's eye positioned behind the frame. The electronic device also includes a lens member having at least a partial region to which a reflective member is applied. The reflective member is configured to reflect light having a specific wavelength such that infrared light reflected from the user's eye to the lens member is incident on the camera. The electronic device further includes a processor operatively connected to the display module and the camera. The processor is configured to control the camera to receive visible light incident from a forward direction of the frame in order to generate first image information, and to receive infrared light reflected by the lens member in order to generate second image information.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
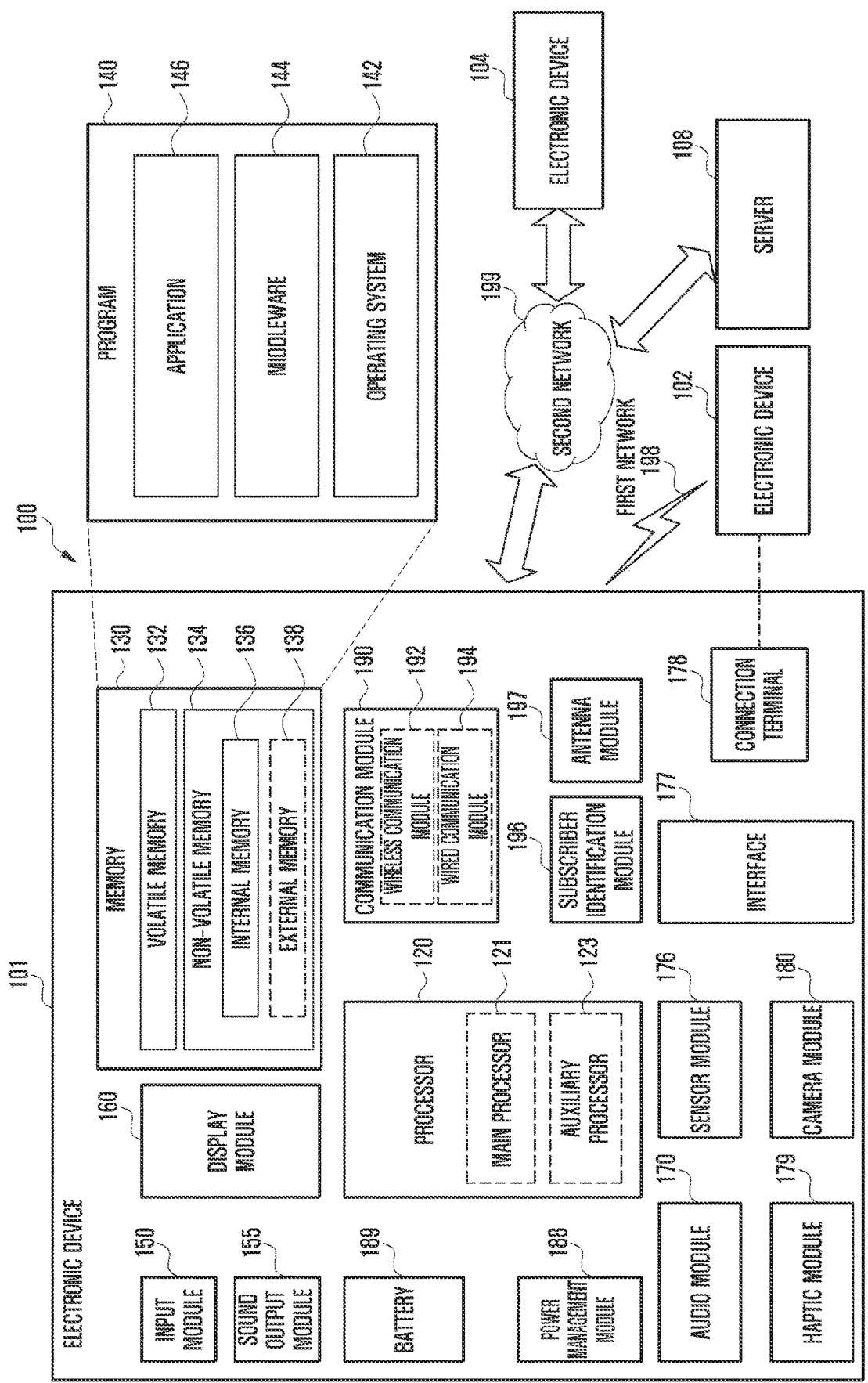
FIG. 1 is a block diagram illustrating an electronic device in a network environment, according to an embodiment.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component, the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPV), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121, The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may he recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These; various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108, example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101 The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
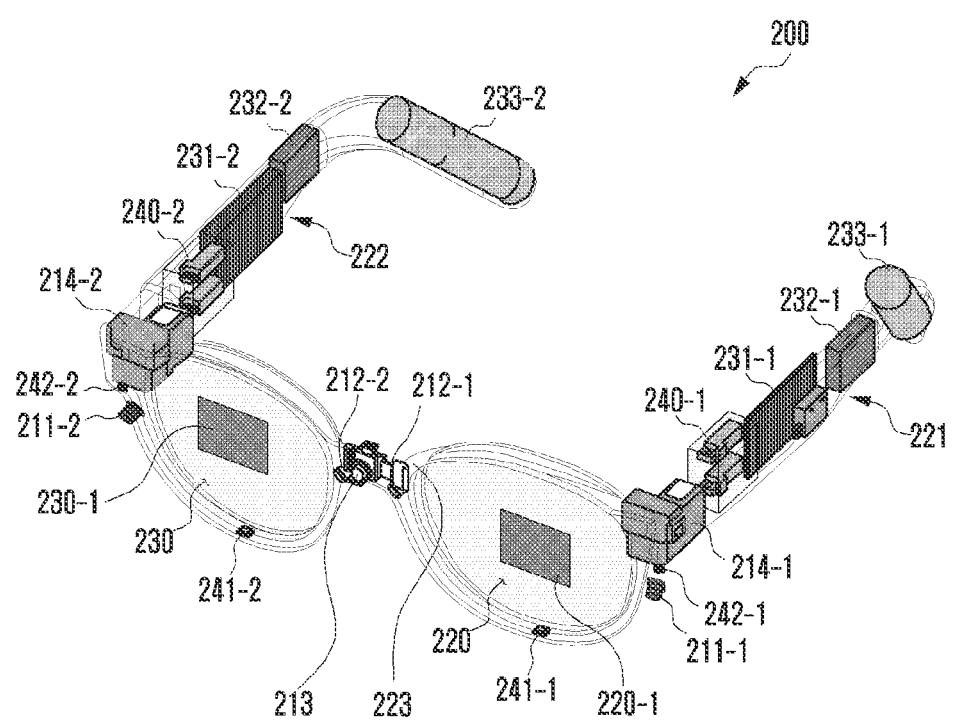
FIG. 2 is a diagram illustrating an electronic device including multiple cameras, according to an embodiment.

FIG. 2 is a diagram illustrating an electronic device including multiple cameras, according to an embodiment.

An electronic device 200 has been manufactured to be wearable on a user's head. For example, the electronic device 200 may be formed in the shape of at least one of glasses, goggles, a helmet, or a hat, but is not limited thereto. The electronic device 200 includes multiple transparent members (e.g., a first transparent member 220 and a second transparent member 230) corresponding to both eyes (e.g., the left eye and the right eye) of a user, respectively.

The electronic device 200 may provide a user with an image related to an AR service. The electronic device 200 may project or display virtual objects onto the first transparent member 220 and/or the second transparent member 230, thereby allowing at least one virtual object to be shown while overlapping the reality recognized by the user through the first transparent member 220 and the second transparent member 230 of the electronic device 200.

Referring to FIG. 2, the electronic device 200 includes a body part 223, support parts (e.g., a first support part 221 and a second support part 222), and hinge parts (e.g., a first hinge part 240-1 and a second hinge part 240-2).

The body part 223 and the first and second support parts 221 and 222 are operatively connected to each other through the first and second hinge parts 240-1 and 240-2. The body part 223 may include a portion formed to be at least partially placed on the user's nose.

Each of the first and second support parts 221 and 222 may include a support member having a shape capable of being put on the user's ear. The first support part 221 may be mounted on a left ear and the second support part 222 may be mounted on the right ear.

The first hinge part 240-1 connects the first support part 221 to the body part 223 such that the first support part 221 can rotate with respect to the body part 223. The second hinge part 240-2 connects the second support part 222 to the body part 223 such that the second support part 222. can rotate with respect to the body part 223. The first and second hinge parts 240-1 and 240-2 of the electronic device 200 may be omitted. For example, the body part 223 may be directly connected to the first and second support parts 221 and 222.

The body part 223 includes at least one transparent member (e.g., the first transparent member 220 and the second transparent member 230), at least one display module (e.g., a first display module 214-1 and a second display module 214-2), at least one camera module (e.g., a front view imaging camera module 213), eye tracking camera modules (e.g., a first eye tracking camera module 212-1 and a second eye tracking camera module 212-2), recognition camera modules (e.g., a first recognition camera module 211-1 and a second recognition camera module 211-2), and at least one microphone (e.g., a first microphone 241-1 and a second microphone 241-2).

In the electronic device 200 of FIG. 2, light generated in first and second display modules 214-1 and 214-2 may be projected on the first and second transparent members 220 and 230 to display information. For example, light generated in the first display module 214-1 may be projected on the first transparent member 220, and light generated in the second display module 214-2 may be projected on the second transparent member 230. When light capable of displaying virtual objects is projected on the first and second transparent members 220 and 230 which are at least partially formed of a transparent material, the user may recognize reality over which the virtual objects are superimposed. It may be understood that the display module 160 of FIG. 1 includes the first and second display modules 214-1 and 214-2 and the first and second. transparent members 220 and 230 of the electronic device 200 of FIG. 2. However, the electronic device 200 is not limited to displaying information through the above-described method. A display module, which may be included in the electronic device 200, may be replaced with a display module including various types of information displaying methods. For example, when a display panel including a light-emitting element formed of a transparent material is embedded in each of the first and second transparent members 220 and 230, it is possible to display information without any separate display module (e.g., the first display module 214-1 and the second display module 214-2). In this case, the display module 160 of FIG. 1 may imply the transparent members 220 and 230 and the display panel included in each of the transparent members 220 and 230.

Virtual objects output through the first and second display modules 214-1 and 214-2 may include information related to an application program executed in the electronic device 200 and/or information related to an external object that is positioned in a real space recognized by the user through the first and second transparent members 220 and 230. The external object may include things existing in the real space. Hereinafter, the real space recognized by the user through the first and second transparent members 220 and 230 is referred to as a field-of-view (FoV) region of the user, For example, the electronic device 200 may identify an external object included in at least a part of a region, which is determined to be the user's FoV, in image information related to a real space, acquired through a camera module (e.g., the imaging camera module 213) of the electronic device 200. The electronic device 200 may output a virtual object related to the identified external object through the first and second display modules 214-1 and 214-2.

The electronic device 200 may display a virtual object related to an augmented reality service together therewith on the basis of image information related the real space, acquired through the imaging camera module 213 of the electronic device 200. The electronic device 200 may display the virtual object on the basis of display modules arranged to correspond to both eyes of the user (e.g., the first display module 214-1 corresponding to a left eye and/or the second display module 214-2 corresponding to a right eye). The electronic device 200 may display the virtual object on the basis of preset configuration information (e.g., resolution, a frame rate, brightness, and/or a display region).

The first and second transparent members 220 and 230 may include condensers and/or waveguides (e.g., a first waveguide 220-1 and a second waveguide 230-1). For example, the first waveguide 220-1 is partially positioned in the first transparent member 220, and the second waveguide 230-1 is partially positioned in the second transparent member 230. Light emitted from the first and second display modules 214-1 and 214-2 may be incident onto one-side surfaces of the first and second transparent members 220 and 230. The light incident onto the one-side surfaces of the first and second transparent members 220 and 230 may be transferred to the user through the first and second waveguides 220-1 and 230-1 positioned in the first and second transparent members 220 and 230. Each of the first and second waveguides 220-1 and 230-1 may be manufactured using glass, plastic, or a polymer, and may include a nanopattern formed on one surface of the inside or outside thereof. For example, the nanopattern may include a polygonal or curved grating structure. Light incident on one surface of each of the first and second transparent members 220 and 230 may be propagated or reflected inside the first and second waveguides 220-1 and 230-1 by the nanopattern and transferred to the user. The first and second waveguides 220-1 and 230-1 may include at least one among at least one diffractive element (e.g., a diffractive optical element (DOE) or a holographic optical element (HOE)) or at least one reflective element (e.g., a reflective mirror). The first and second waveguides 220-1 and 230-1 may use the at least one diffractive element or reflective element to guide, to the user's eyes, light emitted from the first and second display modules 214-1 and 214-2.

The electronic device 200 includes the imaging camera module 213 (e.g., an RGB camera module) configured to capture an image corresponding to a FoV of the user and/or measure the distance to an object, the first and second eye tracking camera modules 212-1 and 212-2 configured to determine the direction of the user's gaze, and the first and second recognition camera modules (gesture camera modules) 211-1 and 211-2 configured to recognize a predetermined space. For example, the imaging camera module 213 may capture an image in the forward direction of the electronic device 200, and the first and second eye tracking camera modules 212-1 and 212-2 may capture an image in a direction opposite to the image-capturing direction of the imaging camera module 213. For example, the first eye tracking camera module 212-1 may partially capture an image of the left eye of the user, and the second eye tracking camera module 212-2 may partially capture an image of the right eye of the user. The imaging camera module 213 may include a high-definition camera module, such as a high-resolution (HR) camera module and/or a photo/video (PV) camera module. The first and second eye tracking camera modules 212-1 and 212-2 may detect the user's pupils to track a gaze direction. The tracked gaze direction may be used when the center of a virtual image including a virtual object is moved in response to the gaze direction. The first and second recognition camera modules 211-1 and 211-2 may sense a user gesture within a preconfigured distance (e.g., a predetermined space) and/or the predetermined space. The first and second recognition camera modules 211-1 and 211-2 may include a camera module including a global shutter (GS). For example, in order to detect and track a fast hand gesture and/or minute movement of a finger or the like, the first and second recognition camera modules 211-1 and 211-2 may be a camera module including a GS capable of reducing a rolling shutter (RS) phenomenon.

The electronic device 200 may use at least one camera module (211-1, 211-2, 212-1, 212-2, or 213) to detect eyes corresponding to a dominant eye and/or a nondominant eye, among the left eye and/or the right eye. For example, the electronic device 200 may sense eyes corresponding to a dominant eye and/or a nondominant eye on the basis of the direction of the user's gaze to an external object or a virtual object.

The number and position of the at least one camera module (e.g., the imaging camera module 213, the first and second eye tracking camera modules 212-1 and 212-2, and/or the first and second recognition camera modules 211-1 and 211-2) included in the electronic device 200 of FIG. 2 may not be limited, For example, the number and position of the at least one camera module (e.g., the imaging camera module 213, the first and second eye tracking camera modules 212-1 and 212-2, and/or the first and second recognition camera modules 211-1 and 211-2) may change based on the form (e.g., shape or size) of the electronic device 200.

The electronic device 200 includes at least one light-emitting device e.g., illumination LED) (e.g., a first light-emitting device 242-1 and a second light-emitting device 242-2) configured to increase the accuracy of at least one camera module (e.g., the imaging camera module 213, the first and second eye tracking camera modules 212-1 and 212-2, and/or the first and second recognition camera modules 211-1 and 211-2). For example, the first light-emitting device 242-1 is disposed at a position corresponding to the left eye of the user, and the second light-emitting device 242-2 is disposed at a position corresponding to the right eye of the user. The first and second light-emitting devices 242-1 and 242-2 may be used as auxiliary means for increasing the accuracy when the user's pupils are imaged by the first and second eye tracking camera modules 212-1 and 212-2, and may include IR LEDs for generating light having an infrared wavelength. Further, the first and second light-emitting devices 242-1 and 242-2 may be used as auxiliary means when a subject to be imaged is not easy to detect due to a dark environment or mixed and reflected light from multiple light sources, at the time of imaging the user's gesture by using the first and second recognition camera modules 211-1 and 211-2.

The electronic device 200 includes microphones (e.g., the first microphone 241-1 and the second microphone 241-2) configured to receive the user's voice and surrounding sound. For example, the first and second microphones 241-1 and 241-2 may be elements included in the audio module 170 in FIG. 1.

The first support part 221 and the second support part 222 include printed circuit boards (PCB) (e.g., a first PCB 231-1 and a second PCB 231-2), speakers (e.g., a first speaker 232-1 and a second speaker 232-2), and batteries (e.g., a first battery 233-1 and a second battery 233-2), respectively.

The first speaker 232-1 is configured to transfer an audio signal to the left ear of the user and the second speaker 232-2 is configured to transfer an audio signal to the right ear of the user. The first and second speakers 232-1 and 232-2 may be elements included in the audio module 170 in FIG. 1.

The electronic device 200 may include multiple batteries 233-1 and 233-2, and may supply power to the first and second PCBs 231-1 and 231-2 through a power management module (e.g., the power management module 188 in FIG. 1). For example, the multiple batteries 233-1 and 233-2 may be electrically connected to the power management module (e.g., the power management module 188 in FIG. 1).

The electronic device 200 has been described as a device configured to display AR. However, the electronic device 200 may also be a device configured to display virtual reality (VR). In this case, the first and second transparent members 220 and 230 may be formed of an opaque material such that the user cannot recognize a real space through the first and second transparent members 220 and 230. Further, the first and second transparent members 220 and 230 may function as the display module 160. For example, each of the first and second transparent members 220 and 230 may include a display panel for displaying information.

The number of cameras included in an electronic device may be reduced, thereby reducing the manufacturing cost of the electronic device. In addition, the weight and volume of the electronic device may be reduced, and power consumed thereby may be reduced, thereby increasing the running time of the electronic device.

Figure 3A:
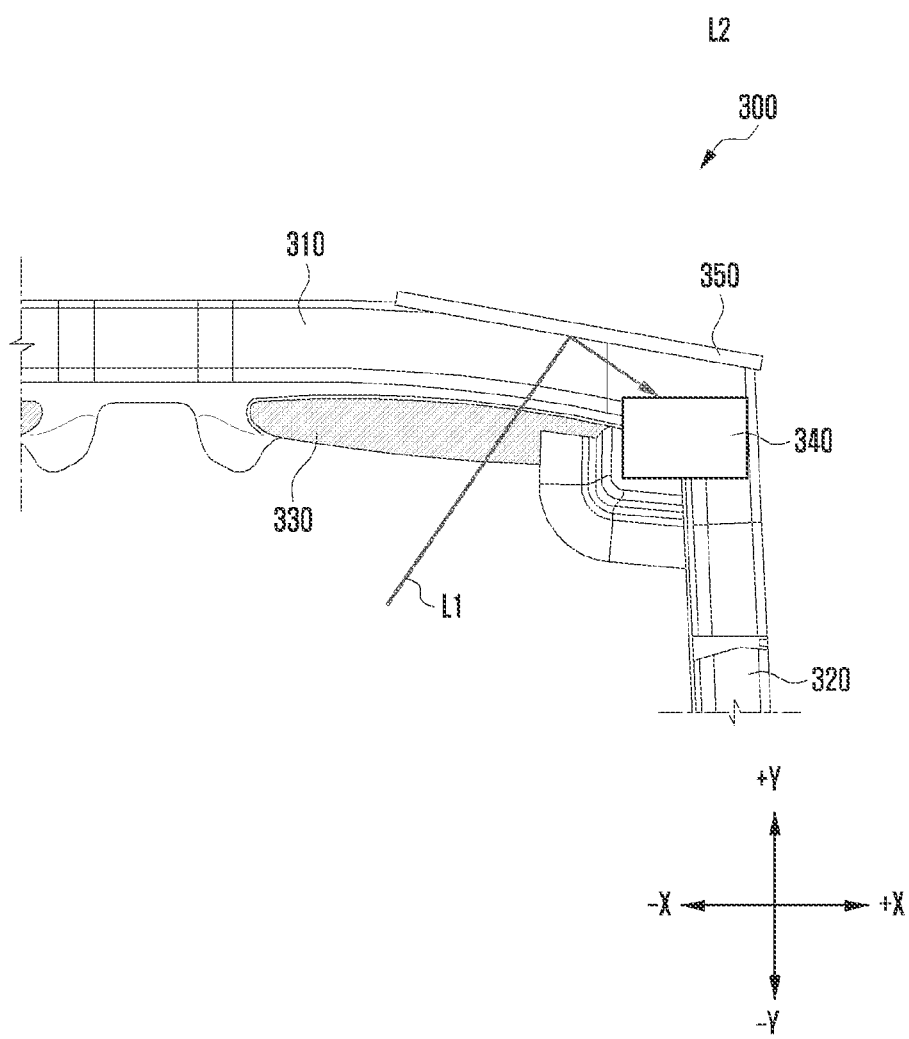
FIG. 3A is a diagram illustrating an electronic device including a lens member operating in a reflective mode, according to an embodiment.
Figure 3B:
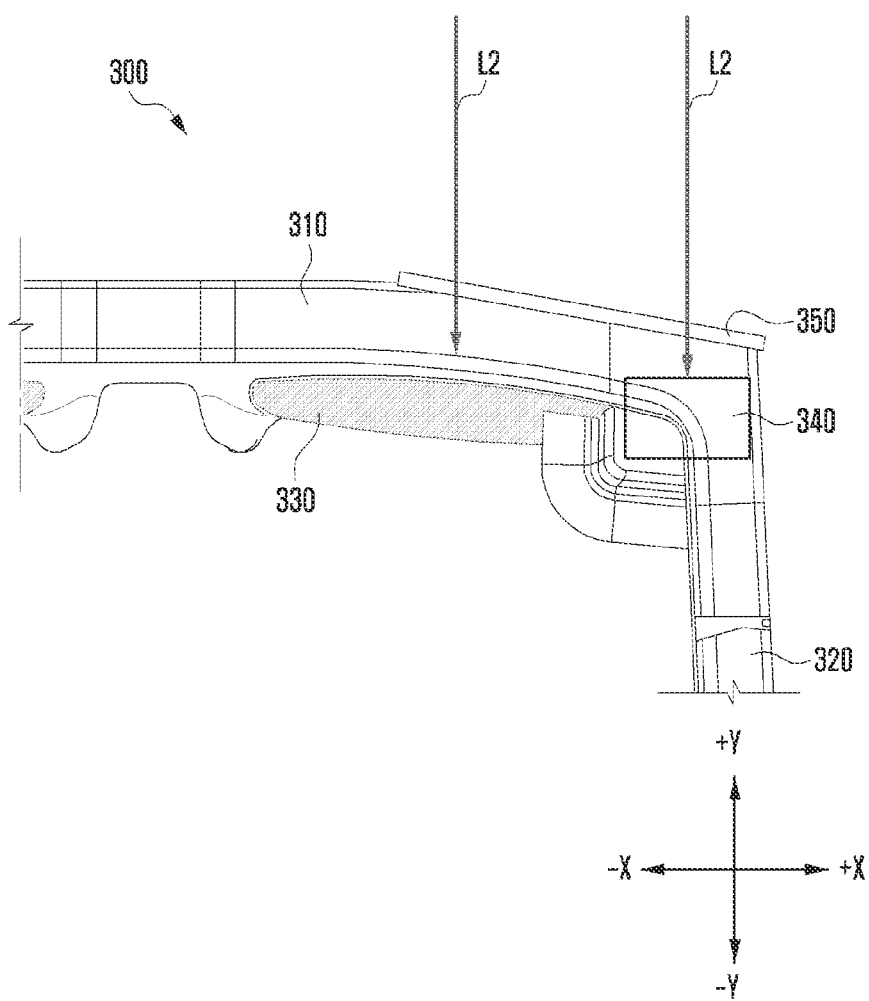
FIG. 3B is a diagram illustrating an electronic device including a lens member operating in a transmissive mode, according to an embodiment.

FIG. 3A is a diagram illustrating an electronic device including a lens member operating in a reflective mode, according to an embodiment. FIG. 3B is a diagram illustrating an electronic device including a lens member operating in a transmissive mode, according to an embodiment.

An electronic device 300 described with respect to FIGS. 3A and 3B may be capable of being worn by a user, similar to the electronic device 200 of FIG. 2. However, the electronic device 300 may not separately include a recognition camera and an eye tracking camera. The electronic device 300 is configured such that a single camera 340 functions as both a recognition camera and an eye tracking camera.

The electronic device 300 includes a frame 310, a transparent member 330, a leg member 320, a display module, a camera 340, a light emitter, a lens member 350, and a processor. Each of the transparent member 330, the leg member 320, the display module, the camera 340, the light emitter, and the lens member 350 may be provided as a pair so as to correspond to both eyes of a user. Hereinafter, for convenience, a description Will be made using the configuration corresponding to one eye of the user.

The frame 310 supports the transparent member 330. The frame 310 may be formed of, for example, a synthetic resin material. The transparent member 330 is fitted in an opening formed in the frame 310, and thus, the frame 310 supports the transparent member 330.

The leg member 320 is rotatably connected to the frame 310. For example, the leg member 320 is rotatably connected to the frame 310 through a hinge. The leg member 320 may be disposed to be placed on the ear of the user. The electronic device 300 may be worn on the face of the user in such a manner that the leg member 320 connected to the frame 310 is placed on the ear of the user. The leg member 320 rotates with respect to the frame 310. The volume of the electronic device 300 may be reduced by rotating the leg member 320 in a direction in which the same approaches the frame 310.

The transparent member 330 is supported by the frame 310. For example, the transparent member 330 is placed in the opening formed in the frame 310. An AR image projected from the display module may be projected on the transparent member 330. The transparent member 330 may have a waveguide formed in at least a partial region thereof. The waveguide may guide, to the user's eye, the AR image projected from the display module. A detailed description of the waveguide is provided with respect to FIG. 2.

The display module may output an AR image generated by a processor. When the display module generates an AR image and projects the same on the transparent member 330, an object included in the AR image is added to forward visible light L2 incident through the transparent member 330, so that AR can be implemented. The display module may be a projector having a very small size (e.g., a micro-projector or a pico-projector), For example, the display module may be an LSD, a DMD, or an LCoS display. Further, the display module may be a transparent display. In this case, a light-emitting element included in the display module may be directly disposed in the transparent member 330. In addition, the display module may be various types of display device for implementing AR.

The camera 340 may include an image sensor capable of recognizing light, such as visible light or infrared light. The camera 340 may be disposed such that a lens faces a forward direction so as to allow the camera 340 to capture an image in front of the frame 310 (e.g., in the +Y direction in FIGS. 3A and 3B). For example, as illustrated in FIGS. 3A and 3B, the camera 340 may be disposed in the lateral direction of the frame 310 (e.g., in the +X direction in FIGS. 3A and 3B). The camera 340 may perform functions of both the recognition camera module 211 and the eye tracking camera module 212 of FIG. 2. The camera 340 may function as a recognition camera to generate first image information, and may function as an eye tracking camera to generate second image information. The first image information may be image information that the image sensor of the camera 340 generates by receiving the visible light L2 incident from the forward direction of the frame 310, and the second image information may be image information that the image sensor of the camera 340 generates by receiving infrared light L1 reflected from the user's eye.

The lens member 350 can switch to a transmissive mode allowing the visible light L2 to pass (e.g., the lens member 350 in FIG. 3B) and a reflective mode capable of reflecting the infrared light L1 (e.g., the lens member 350 in FIG. 3A). The lens member 350 may be disposed on an imaging path of the camera 340. When the lens member 350 is in the transmissive mode, the visible light L2 incident from the forward direction of the frame 310 may pass through the lens member 350 and may be incident on the camera 340. When the lens member 350 is in the reflective mode, the infrared light L1 reflected from the user's eye existing behind the frame 310 may be reflected by the lens member 350 and may be incident on the camera 340. The position of the lens member 350 may be adjusted such that the infrared light L1 reflected from the user's eye can be reflected by the lens member 350 and can be incident on the camera 340. For example, as illustrated in FIGS. 3A and 3B, the lens member 350 may be disposed in a position adjacent to the camera 340 at the side surface of the frame 310.

The lens member 350 may switch between the transmissive mode and the reflective mode on the basis of an electrical signal applied to the lens member 350. For example, the lens member 350 may switch to the reflective mode when an electrical signal is applied thereto, and the lens member 350 may switch to the transmissive mode when an electrical signal is not applied thereto. In another example, the lens member 350 may be switched to the reflective mode when a first electrical signal is applied thereto, and the lens member 350 may switch to the transmissive mode when a second electrical signal different from the first electrical signal is applied thereto.

The lens member 350 may be integrated with the transparent member 330. For example, the lens member may be formed in a film type and may be disposed to the transparent member. Further, the lens member may be formed by etching a partial region of the transparent member.

The processor operatively connected to the camera 340 may cause, when the lens member 350 is in the transmissive mode, the camera 340 to receive the visible light L2 incident from the forward direction of the frame 310, which has passed through the lens member 350, to generate the first image information. The processor operatively connected to the camera 340 may also cause, when the lens member 350 is in the reflective mode, the camera 340 to receive the infrared light L1 reflected by the lens member 350 to generate the second image information.

The light emitter may emit infrared light onto the user's eye. For example, at least one light emitter may be positioned at a portion of the frame 310, and may emit infrared light onto the user's eye under control of the processor 120. The infrared light, which has been emitted onto the user's eye through the light emitter, may be reflected by the user's eye and reflected again by the lens member 350, and then may be incident on the camera 340.

Figure 4:
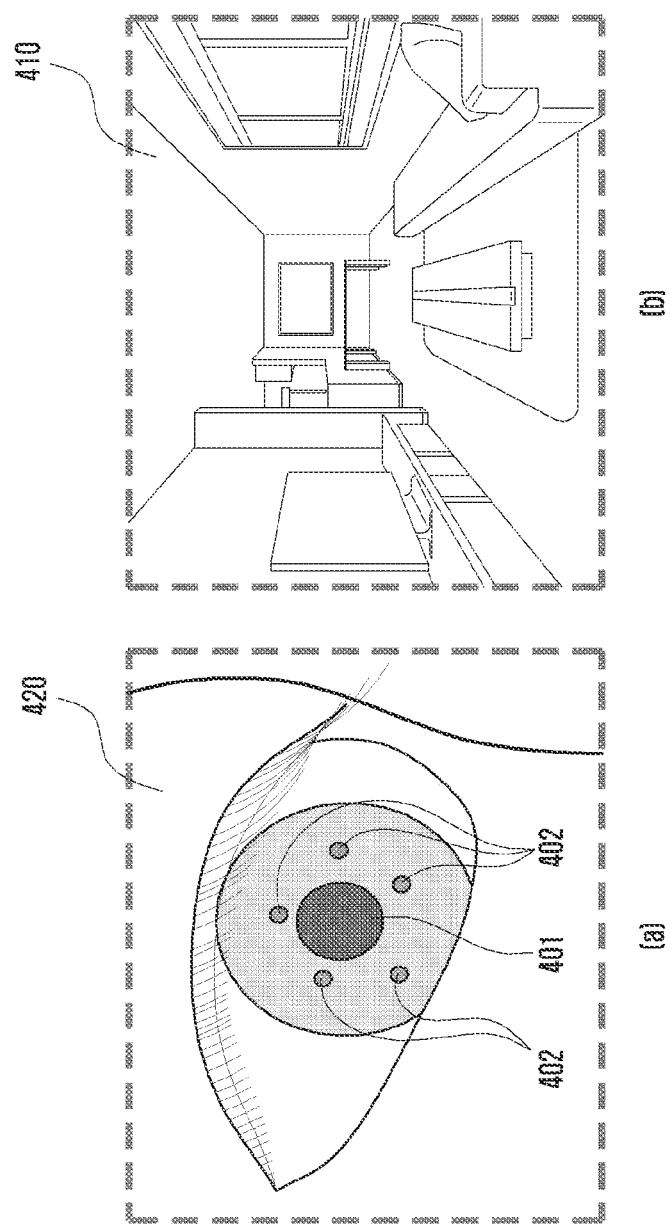
FIG. 4 is a diagram illustrating first image information and second image information, according to an embodiment.

FIG. 4 is a diagram illustrating first image information and second image information, according to an embodiment.

First image information 410 includes image information obtained by capturing an image of an object in front of a frame 310. The first image information 410 may be used to recognize the object existing in front of the frame, and may be used to track the movement of a user's hand or the object existing in front of the frame. For example, when cameras are disposed on each of both side surfaces of the frame, the cameras may track the movement of the hand or the object by using the phase difference between beams of visible light incident on the cameras disposed on both sides. A processor 120 may use the first image information 410 to track movement of an object ahead (e.g., a user's hand), and may perform an operation based on the movement. For example, when a user expresses a specific gesture by the movement of a hand, the processor may recognize the corresponding gesture and may perform an operation mapped to the gesture.

Second image information 420 is used to track movement of a pupil 401 of a user. The movement of the pupil 401 of the user may be tracked through the relative distance between the pupil 401 and light-emitting points 402 of a light emitter projected on the user's eye. The light-emitting points 402 may imply points of the light emitter, at which the intensity of light is strongest and which are projected on the user's eye. Using changes in the relative distance between the multiple light-emitting points 402 and the pupil 401 may make it possible to track the movement of the pupil 401. The light emitter may emit various types of infrared light to the user's eye through at least one light-emitting element on the basis of a designated pattern or a. designated sequence.

The processor 120 may track the movement of the pupil 401 of the user through the second image information 420 to acquire the direction of the user's gaze. The processor may control a display module 160 by using the gaze direction.

For example, the processor may control the display module such that the direction of the user's gaze is aligned with the center of an image projected on a transparent member 330. The processor may control the display module such that the resolution of an AR image corresponding to a predetermined region with reference to the direction of the user's gaze is adjusted to be higher than that of the remaining region. The processor may configure a predetermined region as a region of interest with reference to the direction of the user's gaze, and may generate an AR image such that an AR object is positioned in the predetermined region. In addition, the processor may use the gaze direction acquired through the second image information 420 to control the display module in various ways or generate and/or display an AR image.

Figure 5:
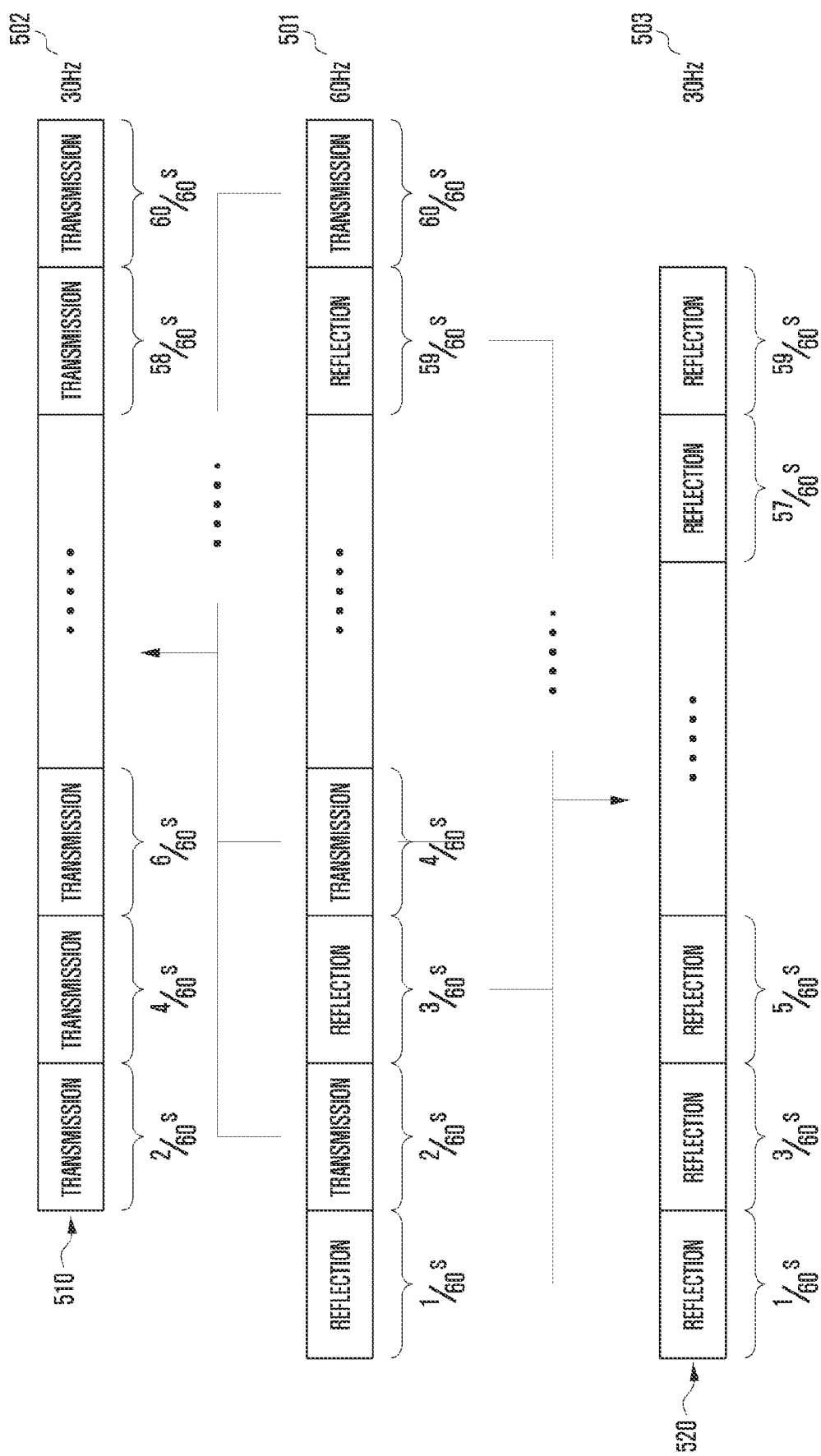
FIG. 5 is a diagram illustrating a lens member and an operation of generating first image information and second image information using the lens member, according to an embodiment.

FIG. 5 is a diagram illustrating a lens member and an operation of generating first image information and second image information by using the lens member, according to an embodiment.

The lens member 350 may switch from a reflective mode to a transmissive mode by a first operation frequency. For example, when a first operation frequency 501 is 60 Hz, switching from the reflective mode to the transmissive mode or switching from the transmissive mode to the reflective mode may be performed 60 times per second. The lens member may alternately have 30 transmissive modes and 30 reflective modes per second. As illustrated in FIG. 5, the lens member may operate in the reflective mode at n/60 s, and may operate in the transmissive mode at (n+1)/60 s. Here, n is a natural number from 1 to 59.

A processor 120 may control a camera 340 to generate first image information by a second operation frequency and generate second image information by a third operation frequency. The sum of the second operation frequency and the third operation frequency may be equal to the first operation frequency. For example, when the first operation frequency 501 is 60 Hz, each of a second operation frequency 502 and a third operation frequency 503 may be 30 Hz. As illustrated in FIG. 5, at n/60 s, the lens member may operate in the reflective mode. The processor may control the camera to generate the second image information at n/60 s. Further, at (n+1)/60 s, the lens member may operate in the transmissive mode. The processor may control the camera to generate the first image information at (n+1)/60 s. Here, n is a natural number from 1 to 59. When the operation frequencies, at which the first image information and the second image information are generated, are linked with the operation frequencies of the lens member, as described above, the first image information and the second image information may be generated in time division. As in the above-described example, when the first operation frequency of the lens member is 60 Hz, the first image information and the second image information of 30 fps may be generated.

The first operation frequency is not limited to 60 Hz. For example, the first operation frequency may be 60 Hz or higher, or may be 60 Hz or lower. For example, the first operation frequency may be 30 Hz or 120 Hz. A time and/or a period, during which the lens member operates in the transmissive mode may be different from a time and/or a period, during which the lens member operates in the reflective mode. For example, the e allocated to the reflective mode may be longer, or the time allocated to the transmissive mode may be longer. When the first operation frequency is 60 Hz, the second operation frequency related to the reflective mode may be 40 Hz, and the third operation frequency related thereto may be 20 Hz.

Figure 6:
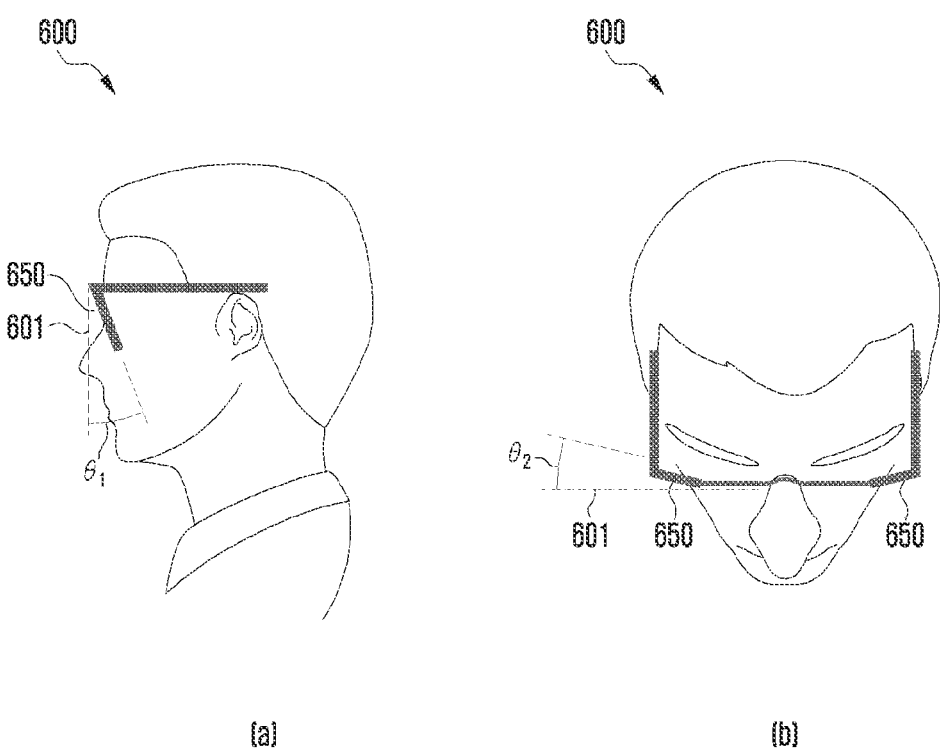
FIG. 6 is a diagram illustrating placement of a lens member, according to an embodiment.

FIG. 6 is a diagram illustrating placement of a lens member, according to an embodiment.

Lens members 650 may be disposed in an electronic device in a state in which the angle of the lens members 650 is adjusted such that infrared light reflected from a user's eyes can be effectively incident on a camera through the lens members 650.

For example, when an electronic device 600 is viewed from the side surface thereof, as illustrated in FIG. 6A, the lens members 650 is disposed to be inclined by a first angle θ1 with respect to a reference surface 601. The reference surface 601 may be an imaginary surface perpendicular to the forward direction of the electronic device 600. Further, when the electronic device 600 is viewed from above, as illustrated in FIG. 6B, the lens members 650 is disposed to be inclined by a second angle θ2 with respect to the reference surface 601. The first angle θ1 may be about 10 degrees, and the second angle θ2 may be about 12 degrees. The first angle θ1 and the second angle θ2, described above, are merely examples, and the first angle θ1 and the second angle θ2 may be changed. For example, the first angle θ1 may be larger than 10 degrees, and the second angle θ2 may be larger to 12 degrees.

Thus, when each of the lens members 650 is disposed to be inclined by the first angle θ1 and the second angle 82, infrared light reflected from the user's eyes may be easily incident on the camera 340. For example, the lens members 650 are inclined by the second angle θ2, and thus, infrared light reflected from the user's eyes may be reflected by the lens members 650 without any interference by the user's eyelashes or eyebrows, and may be incident on the camera.

Figure 7:
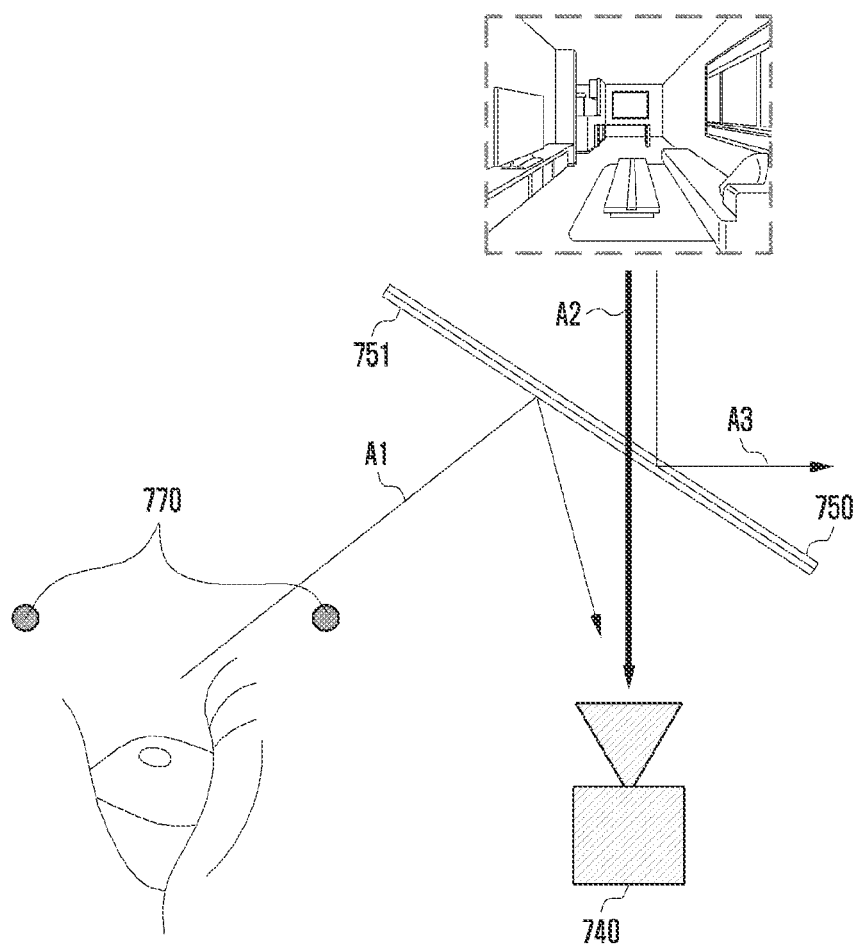
FIG. 7 is a diagram illustrating an electronic device acquiring image information, according to an embodiment.

FIG. 7 is a diagram illustrating an electronic device acquiring image information, according to an embodiment. Hereinafter, elements which are not described are identical or similar to the elements described above in FIGS. 3A and 3B, and thus, a detailed description thereof will be omitted.

A lens member 750 includes a reflective member 751. The reflective member 751 may be, for example, a film for reflecting infrared light, The reflective member 751 may be applied on one surface of the lens member 750. In FIG. 7, the reflective member 751 applied to the lens member 750 may reflect both infrared light A1 and infrared light A3 incident on the lens member 750. When visible light A2 and the infrared light A1 and A3 are incident on the lens member 750 having the reflective member 751 applied thereto, the visible light A2 may pass, and the infrared light A1 and A3 may all be reflected. In FIG. 7, the reflective member 751 is disposed on one surface of the lens member 750. However, the reflective member 751 may be included inside the lens member 750.

The lens member 750 is disposed in a position in which infrared light A1 reflected from a user's eye can be reflected by the lens member 750 and incident on a camera 740. For example, as illustrated in FIG. 7, the lens member 750 is disposed on the imaging path of the camera 740.

The lens member 750 may have a size which allows the infrared light A1 reflected from the user's eye to be reflected by the lens member 750 and incident on the camera 740. For example, as illustrated in FIG. 7, the lens member 750 has a size that allows at least some beams of infrared light A1 reflected from the user's eye to be incident on the camera 740.

Light emitters 770 may emit infrared light to the user's eye. Infrared light generated in the light emitters 770 may be reflected by the user's eye. A part of the infrared light A1 reflected by the user's eye may travel toward the lens member 750. The light emitters 770 may have a designated angle so as to emit infrared light to the user' eye such that the infrared light emitted onto the user' eye can be reflected by the user's eye and be incident on the lens member 750. The infrared light A1 having traveled to the lens member 750 may be reflected by the reflective member 751 applied to the lens member 750 and incident on the camera 740. Simultaneously, visible light A2 incident from the forward direction may pass through the lens member 750 and may be incident on the camera 740. The infrared light A1 reflected by the lens member 750 and the visible light A2 having passed through the lens member 750 may all be incident on the camera 740.

First image information may be generated using the visible light A2 incident on the camera 740. Further, second image information may be generated using the infrared light A1 incident on the camera 740. The first image information may be used to recognize an object ahead, and may be used to track movement of the user's hand or the object ahead. The second image information may be used to track movement of the user's pupil.

The processor 120 may switch the light emitters 770, which emit infrared light onto the user's eye, to a turned-on/off state, thereby generating the second image information. For example, light incident on the camera 740 while the light emitters 770 are turned on may be the infrared light A1 reflected by the user's eye and the visible light A2 incident from the forward direction. Light incident on the camera 740 while the light emitters 770 are turned off may be the visible light A2 incident from the forward direction. An image signal detected by the camera 740 while the light emitters 770 are turned on may include image signals generated by the infrared light A1 and the visible light A2. An image signal detected by the camera 740 while the light emitters 770 are turned off may be an image signal generated by visible light. Therefore, only an image signal generated by infrared light may be acquired by excluding the image signal detected by the camera 740 while the light emitters 770 are turned off from the image signal detected by the camera 740 while the light emitters 770 are turned on. The second image information may be generated using the image signal generated by the infrared light.

Figure 8A:
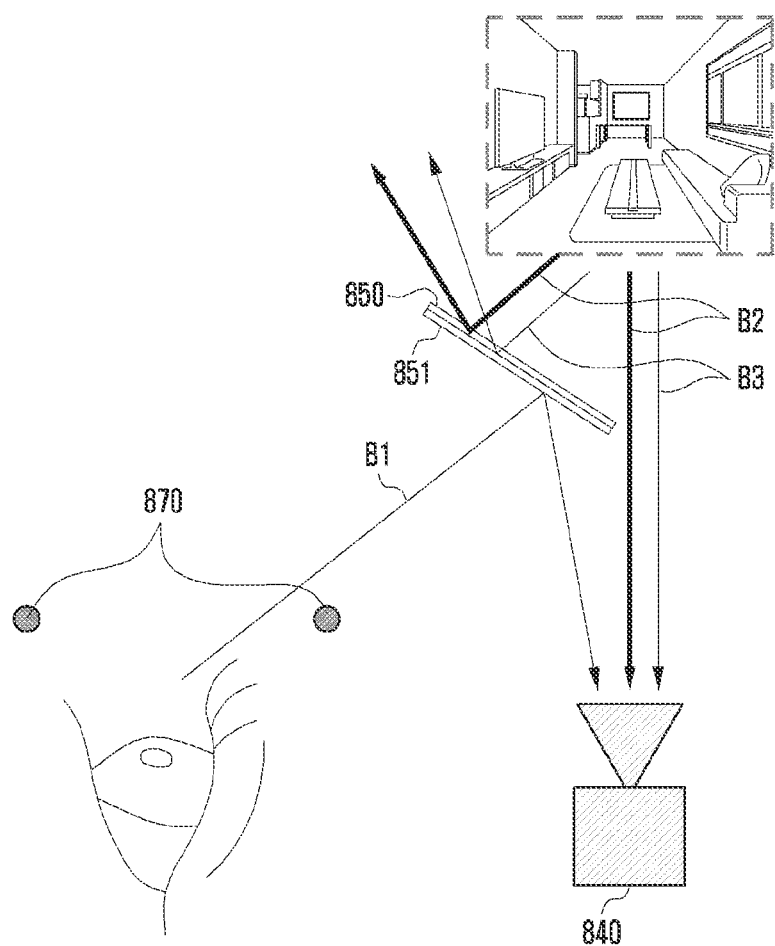
FIG. 8A is a diagram illustrating an electronic device acquiring image information, according to an embodiment.
Figure 8B:
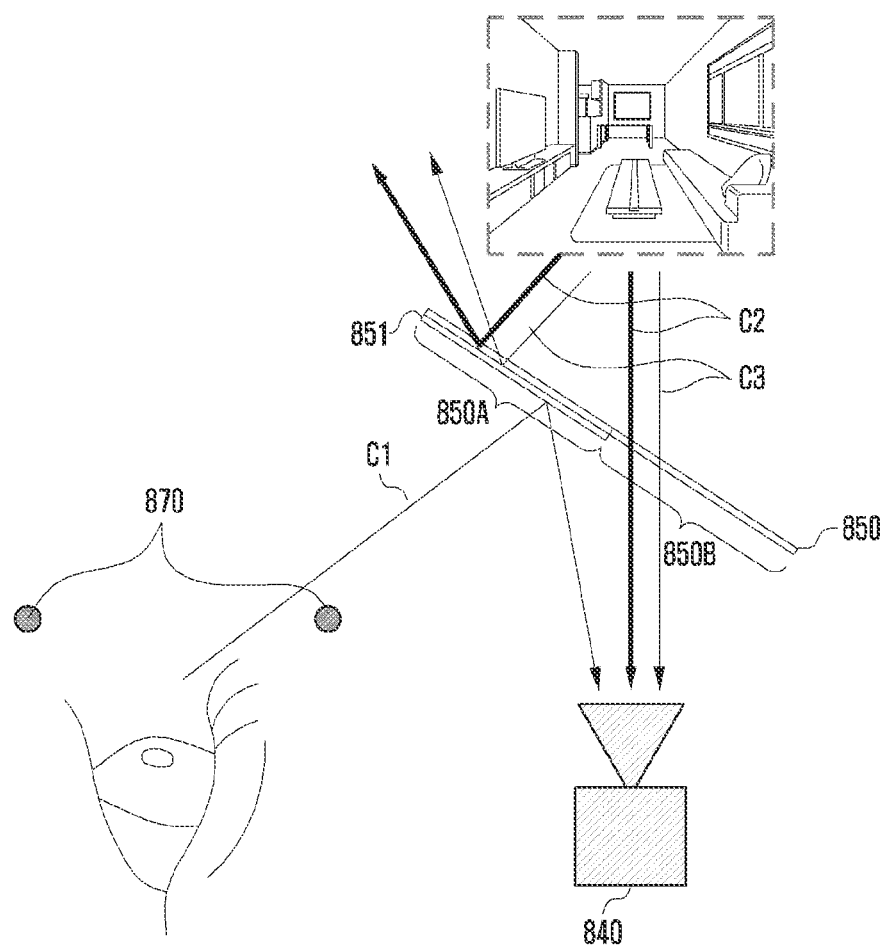
FIG. 8B is a diagram illustrating an electronic device acquiring image information, according to an embodiment.
Figure 9:
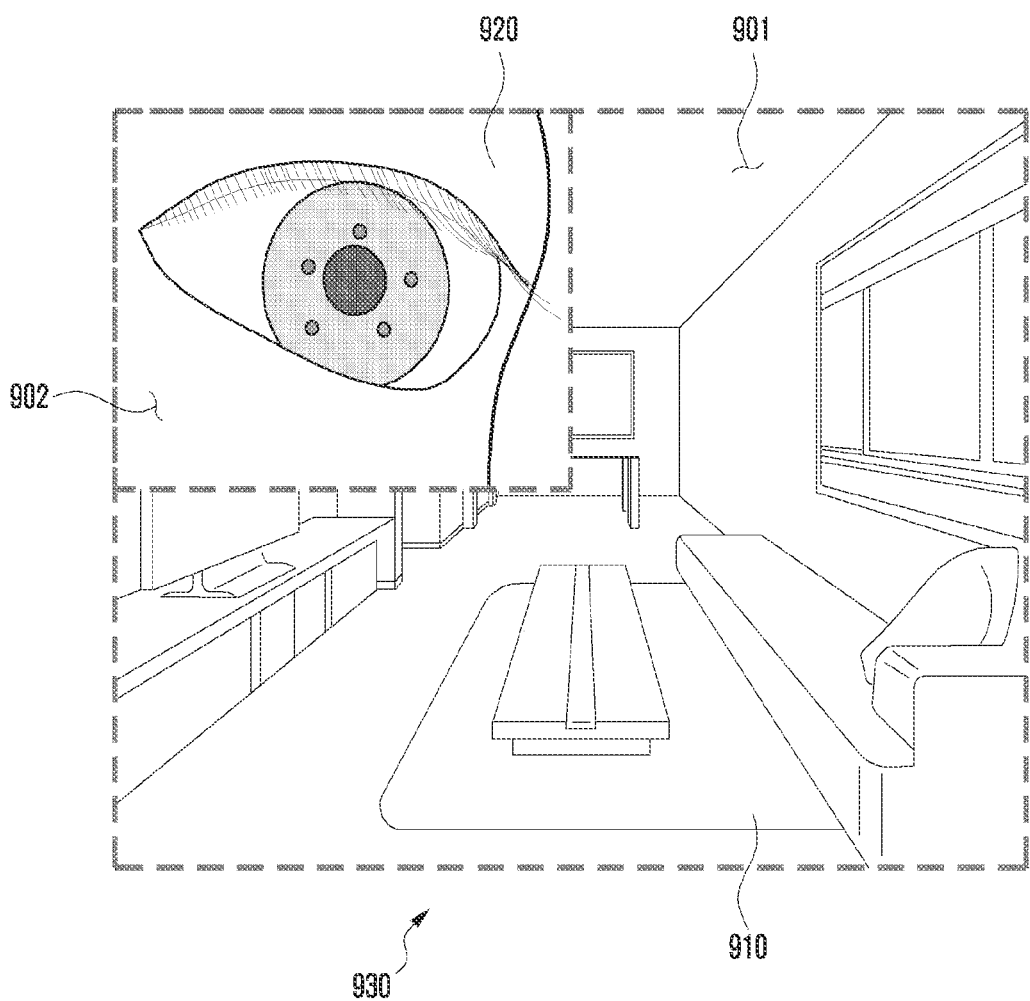
FIG. 9 is a diagram illustrating third image information, according to an embodiment.

FIGS. 8A and 8B are diagrams illustrating an electronic device acquiring image information, according to an embodiment. FIG. 9 is a diagram illustrating third image information, according to an embodiment. Hereinafter, elements, which are not described, are identical or similar to the elements described with reference to FIGS. 3A and 3B, and thus, a detailed description thereof will be omitted.

A lens member 850 includes a reflective member 851. The reflective member 851 may be, for example, a film for reflecting both infrared light and visible light. The reflective member 851 may be applied on one surface of the lens member 850, The reflective member 851 may be placed in the lens member 850. As illustrated in FIGS. 8A and 8B, the reflective member 851 applied on the lens member 850 reflects all of visible light B2 and infrared light B1 and B3, which are incident on the lens member 850. In FIGS. 8A and 8B, it is illustrated that the reflective member 851 is disposed on one surface of the lens member 850. However, the reflective member 851 may be included in the lens member 850.

The lens member 850 is disposed at a position in which infrared light B1 reflected from a user's eye can be reflected by the lens member 850 and incident on a camera 840. For example, as illustrated in FIG. 8A, the lens member 850 is disposed on the imaging path of the camera 840. The size of the lens member 850 may be adjusted such that a part of the visible light B2 incident from the forward direction of the lens member 850 may be directly incident on the camera 840 without passing through the lens member 850. For example, the lens member 850 may be smaller than the lens member 750 illustrated in FIG. 7.

Light emitters 870 may emit infrared light onto the user's eye. The infrared light emitted by the light emitters 870 may be reflected by the user's eye. A part of infrared light B1 reflected by the user's eye travels to the lens member 850. The infrared light B1, which has traveled to the lens member 850, is reflected by the reflective member 851 applied on the lens member 850 and incident on the camera 840. Simultaneously, the visible light B2 incident from the forward direction without passing through the lens member 850 is incident on the camera 840. All of the infrared light B1 reflected by the lens member 850, the visible light B2 bypassing the lens member 850, and infrared light 133 bypassing the lens member 850 are incident on the camera 840.

As illustrated in FIG. 8B, the reflective member 851 capable of reflecting infrared light C1 and visible light C2 may be applied to only a first portion 850A of the lens member 850. Infrared light C1 reflected from the user's eye may be reflected by the first portion 850A to which the reflective member 851 is applied and incident on the camera 840. The visible light C2 incident from the forward direction may pass through the lens member 850 at a second portion 850B to which the reflective member 851 is not applied, and may be incident on the camera 840.

The camera 840 of an electronic device to which the lens member 850 illustrated in FIGS. 8A and 8B is applied may generate third image information 930 of FIG. 9. A first region 901 of the third image information 930 may include first image information 910 generated by receiving visible light, and a second region 902 of the third image information 930 may include second image information 920 generated by receiving infrared light. The second region 902 may be a region which only infrared light (e.g., the infrared light C1 reflected from the user's eye) can reach because visible light does not pass through the lens member due to the reflective member 851 applied to the lens member 850. The third image information 930 includes both the first image information 910 and the second image information 920, and thus, the third image information 930 can be used to recognize an object ahead, track movement of the user's hand or the object ahead, and track movement of the user's pupil.

Figure 10:
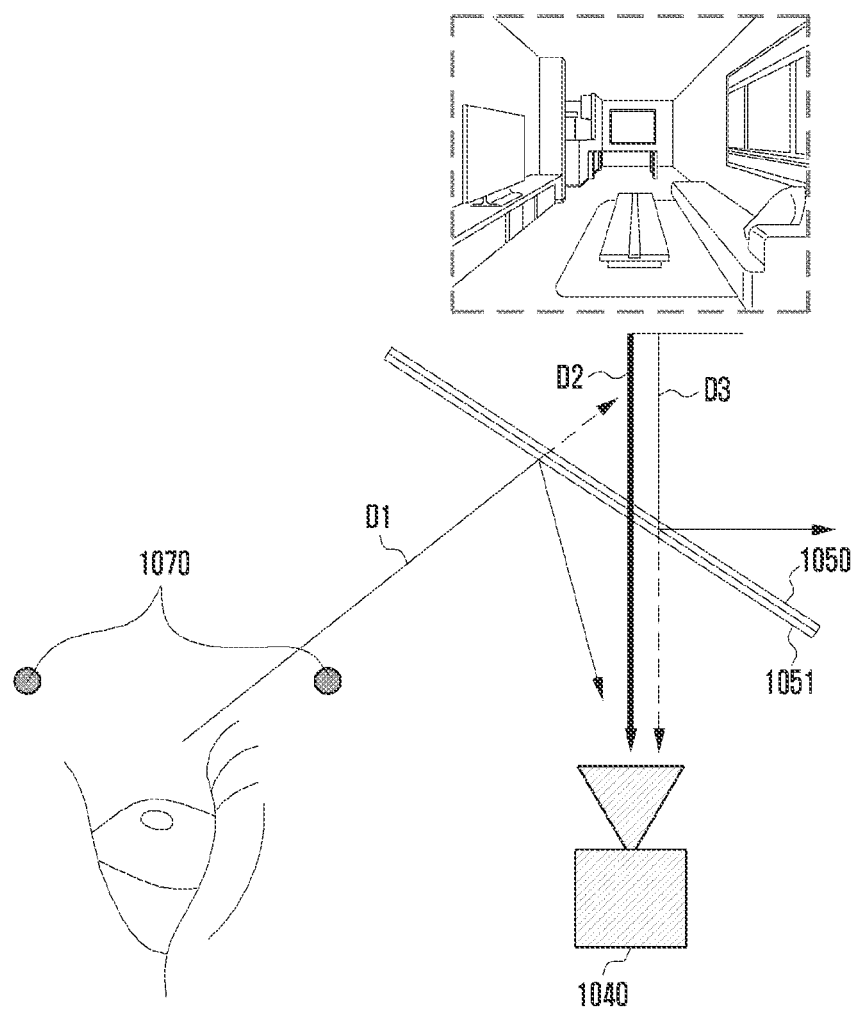
FIG. 10 is a diagram illustrating an electronic device acquiring image information, according to an embodiment.
Figure 11:
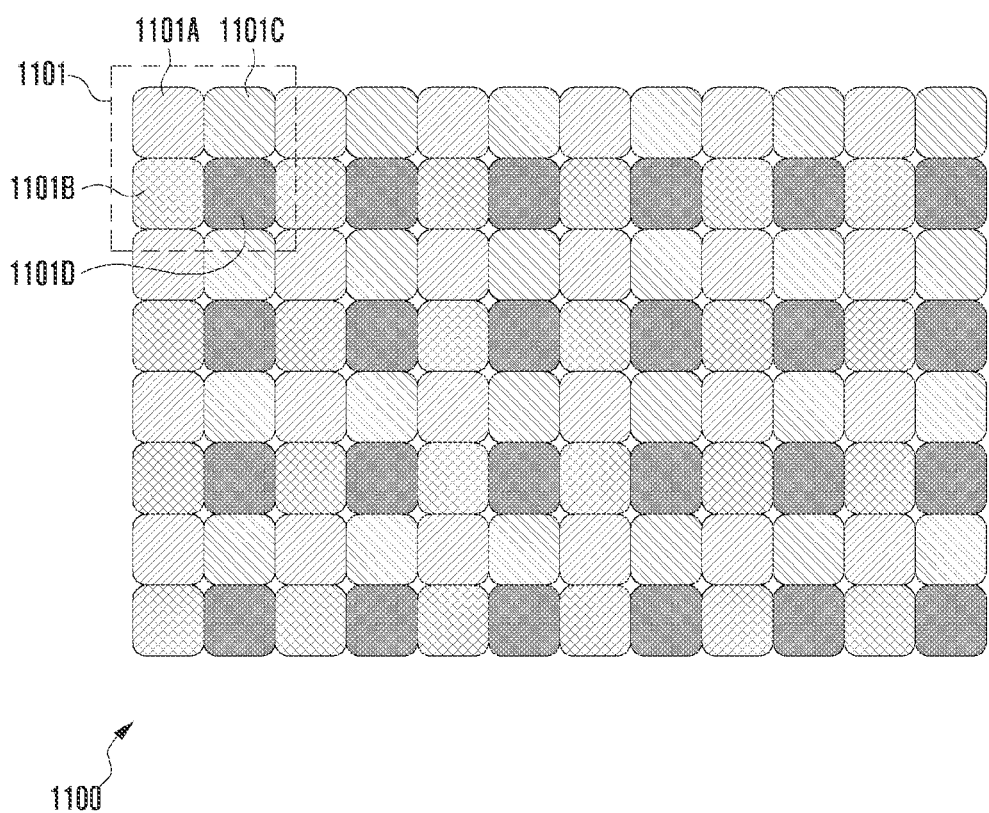
FIG. 11 is a diagram illustrating an image sensor included in a camera of an electronic device, according to an embodiment.

FIG. 10 is a diagram illustrating an electronic device acquiring image information, according to an embodiment. FIG. 11 is a diagram illustrating an image sensor included in a camera of an electronic device, according to an embodiment. Hereinafter, elements, which are not described, are identical or similar to the elements illustrated in FIGS. 3A and 3B, and thus, a detailed description thereof will be omitted.

A lens member 1050 includes a reflective member 1051. The reflective member 1051 may be, for example, a film for reflecting a part of infrared light and allowing a part of the infrared light to partially pass. The reflective member 1051 may be applied on one surface of the lens member 1050. In FIG. 10, the reflective member 1051 applied on the lens member 1050 only partially reflects infrared light D1 and D3 incident on the lens member 1050 (e.g., reflectivity 50%). When visible light D2. and infrared light D1 and D3 are incident on the lens member 1050 having the reflective member 1051 applied thereto, the visible light D2 passes through and the infrared light D1 and D3 partially passes through and is partially reflected. In FIG. 10, the reflective member 1051 is disposed on one surface of the lens member 1050. However, the reflective member 1051 may be included in the lens member 1050.

The lens member 1050 is disposed in a position in which infrared light D1 reflected from a user's eye can be reflected by the lens member 1050 and incident on a camera 1040. As illustrated in FIG. 10, the lens member 1050 is disposed on an imaging path of the camera 1040.

Light emitters 1070 may emit infrared light to the user's eye. Infrared light emitted from the light emitters 1070 may be reflected by the user's eye. A part of the infrared light D1 reflected by the user's eye may travel to the lens member 1050. The infrared light D1 having traveled to the lens member 1050 may be partially reflected by the reflective member 1051 applied on the lens member 1050 and then incident on the camera 1040. Simultaneously, visible light D2 and a part of infrared light D3, incident from the forward direction, may pass through the lens member 1050 and may he incident on the camera 1040. Both the infrared light D1 reflected by the lens member 1050 and the visible light D2 having passed through the lens member 1050 may be incident on the camera 1040.

An image sensor 1100 included in a camera includes multiple pixels 1101. Each pixel 1101 includes a light-receiving element configured to convert incident light into an electrical signal. The light-receiving element included in each pixel 1101 includes RGB elements 1101A, 1101B, and 1101C configured to convert visible light having red, green, and blue wavelengths into electrical signals, respectively, and an infrared light element 1101D configured to convert infrared light into an electrical signal.

The infrared light D1 and D3 and the visible light D2 may be simultaneously incident on the camera 1040 illustrated in FIG. 10. A processor may generate first image information by using electrical signals generated by the RGB elements 1101A, 1101B, and 1101C of the image sensor 1100 included in the camera. The processor may generate second image information by using an electrical signal generated by the infrared light element 1101D of the image sensor 1100 included in the camera. The processor 120 may generate the first image information on the basis of the visible light D2 and the infrared light D3 incident on the camera 1040 at a first time point, and may generate the second image information by removing the first image information from an image generated based on the visible light D2 and the infrared light D1 and D3 incident on the camera 1040 at a second time point.

The first image information may be generated using the visible light D2 incident on the camera 1040. Further, the second image information may be generated using the infrared light D1 and D3 incident on the camera. The first image information may be used to recognize an object ahead, and to track movement the user's hand or the object ahead. The second image information may be used to track movement of the user's pupil.

According to an embodiment, an electronic device includes a frame, a transparent member supported by the frame, a leg member rotatably connected to the frame, a display module configured to project an image onto the transparent member, a camera disposed on at least one of the frame and the leg member, and a light emitter configured to emit infrared light toward a user's eye positioned behind the frame. The electronic device also includes a lens member configured to switch between a reflective mode reflecting infrared light and a transmissive mode allowing visible light to pass, and disposed such that infrared light reflected from the user's eye to the lens member in the reflective mode is incident on the camera. The electronic device further includes a processor operatively connected to the display module and the camera. The processor is configured to control the camera to receive visible light, which passes through the lens member in the transmissive mode, in order to generate first image information, and to receive infrared light, which is reflected by the lens member in the reflective mode of the lens member, in order to generate second image information.

Further, the lens member may be switched between the reflective mode and the transmissive mode by an electrical signal applied to the lens member.

Further, the lens member may switch between the reflective mode to the transmissive mode by a first operation frequency. The processor may control the camera to generate the first image information by a second operation frequency and to generate the second image information by a third operation frequency. A sum of the second operation frequency and the third operation frequency may correspond to the first operation frequency.

Further, in order for the infrared light reflected from the user's eye to be incident on the camera, the lens member may be disposed to be inclined by a first angle with respect to a reference surface when the electronic device is viewed from a first direction, and the lens member may be disposed to be inclined by a second angle with respect to the reference surface when the electronic device is viewed from a second direction perpendicular to the first direction.

Further, the first angle may be 10 degrees, and the second angle may be 12 degrees.

Further, the processor may control the display module to display an AR image on the transparent member, to detect the direction of the user's gaze by using the second image information, and to change, according to the direction of the user's gaze, a position of the AR image projected on the transparent member.

Further, the processor may partially adjust, based on the direction of the user's gaze, the resolution of the AR image or the position of an object included in the AR image.

Further, the processor may control at least a part of the AR image, based on the first image information.

According to an embodiment, an electronic device includes a frame, a transparent member supported by the frame, a leg member rotatably connected to the frame a display module configured to project an image onto the transparent member, a camera disposed on at least one of the frame and the leg member, and a light emitter configured to emit infrared light toward a user's eye positioned behind the frame. The electronic device also includes a lens member having at least a partial region to which a reflective member is applied. The reflective member is configured to reflect light having a specific wavelength such that infrared light reflected from the user's eye to the lens member is incident on the camera. The electronic device further includes a processor operatively connected to the display module and the camera. The processor may control the camera to receive visible light incident from the forward direction of the frame in order to generate first image information, and to receive infrared light reflected by the lens member in order to generate second image information.

Further, the area of the lens member and an arrangement relationship between the lens member and the camera may be adjusted such that the visible light incident from the forward direction of the frame passes through the lens member and is incident on the camera.

Further, the reflective member applied to the lens member may be formed of a material that allows visible light incident on the lens member to totally pass and that totally reflects infrared light.

Further, the processor may generate the second image information by removing a first image signal, which is detected by the camera while the light emitters are turned off, from a second image signal detected by the camera while the light emitters are turned on.

Further, a reflective member applied to the lens member may be formed of a material capable of reflecting both visible light and infrared light and may be applied to only one region of the lens member. The camera may generate third image information which includes the first image information in a first region and the second image information in a second region.

Further, the area of the lens member and an arrangement relationship between the lens member and the camera may be adjusted such that a part of the visible light incident from the forward direction of the frame is directly incident on the camera. The camera may generate third image information which includes, in a first region, the first image information generated by receiving visible light directly incident on the camera, and includes the second image information in a second region.

Further, the reflective member applied to the lens member may be formed of a material capable of partially reflecting infrared light incident on the lens member. Each of multiple pixels of an image sensor included in the camera may include an RGB element configured to convert the received visible light into an electrical signal and an infrared light element configured to convert the received infrared light into an electrical signal.

Further, in order for infrared light reflected from the user's eye to be incident on the camera, the lens member may be disposed to be inclined by a first angle with respect to a reference surface when the electronic device is viewed from a first direction, and the lens member may be disposed to be inclined by a second angle with respect to the reference surface when the electronic device is viewed from a second direction perpendicular to the first direction.

Further, the first angle may be 10 degrees, and the second angle may be 12 degrees.

Further, the processor may control the display module to display an AR image on the transparent member, to detect a direction of the user's gaze by using the second image information, and to change, according to the direction of the user's gaze, a position of the AR image projected on the transparent member.

Further, the processor may partially adjust, based on the direction of the user's gaze, the resolution of the AR image or the position of an object included in the AR image.

Further, the processor may control, based on the first image information, at least a part of the AR image.

Embodiments disclosed in the specification and the drawings are only particular examples provided to easily describe the technical matters according to embodiments disclosed in the disclosure and to aid in understanding of the disclosure, and are not to limit the scope of embodiments disclosed in the disclosure. Therefore, it should be construed that all modifications or modified forms capable of being derived from the technical idea of the disclosure, in addition to the embodiments disclosed herein, are included in the scope of various embodiments disclosed in the disclosure.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
  a frame;
  a transparent member supported by the frame;
  a leg member rotatably connected to the frame;
  a display module configured to project an image onto the transparent member;
  a camera disposed on at least one of the frame and the leg member;
  a light emitter configured to emit infrared light toward a user's eye positioned behind the frame;
  a lens member configured to switch between a reflective mode reflecting infrared light and a transmissive mode allowing visible light to pass, and disposed such that infrared light reflected from the user's eye to the lens member in the reflective mode is incident on the camera; and
  a processor operatively connected to the display module and the camera.
  wherein the processor is configured to control the camera to receive visible light, which passes through the lens member in the transmissive mode, in order to generate first image information, and to receive infrared light, which is reflected by the lens member in the reflective mode, in order to generate second image information.

2. The electronic device of claim 1, wherein the lens member is configured to be switched between the reflective mode and the transmissive mode by an electrical signal applied to the lens member.

3. The electronic device of claim 2, wherein:
  the lens member is configured to switch between the reflective mode and the transmissive mode by a first operation frequency,
  the processor is further configured to control the camera to generate the first image information by a second operation frequency and to generate the second image information by a third operation frequency, and
  a sum of the second operation frequency and the third operation frequency corresponds to the first operation frequency.

4. The electronic device of claim 1, wherein, in order for the infrared light reflected from the user's eye to be incident on the camera, the lens member is disposed to be inclined by a first angle with respect to a reference surface when the electronic device is viewed from a first direction, and the lens member is disposed to be inclined by a second angle with respect to the reference surface when the electronic device is viewed from a second direction perpendicular to the first direction.

5. The electronic device of claim 4, wherein the first angle is 10 degrees, and the second angle is 12 degrees.

6. The electronic device of claim 1, wherein the processor is further configured to control the display module to display an augmented reality (AR) image on the transparent member, to detect a direction of a user's gaze using the second image information, and to change, based on the direction of the user's gaze, a position of the AR image projected on the transparent member.

7. The electronic device of claim 6, wherein the processor is further configured to partially adjust, based on the direction of the user's gaze, a resolution of the AR image or a position of an object included in the AR image.

8. The electronic device of claim 6, wherein the processor is further configured to control at least a part of the AR image, based on the first image information.

9. An electronic device comprising:
  a frame;
  a transparent member supported by the frame;
  a leg member rotatably connected to the frame;
  a display module configured to project an image onto the transparent member;
  a camera disposed on at least one of the frame and the leg member;
  a light emitter configured to emit infrared light toward a user's eye positioned behind the frame;
  a lens member having at least a partial region to which a reflective member is applied, the reflective member is configured to reflect light having a specific wavelength such that infrared light reflected from the user's eye to the lens member is incident on the camera; and a processor operatively connected to the display module and the camera, wherein the processor is configured to control the camera to receive visible light incident from a forward direction of the frame in order to generate first image information, and to receive infrared light reflected by the lens member in order to generate second image information.

10. The electronic device of claim 9, wherein an area of the lens member and an arrangement relationship between the lens member and the camera are adjusted such that the visible light incident from the forward direction of the frame passes through the lens member and is incident on the camera.

11. The electronic device of claim 10, wherein the reflective member applied to the lens member is formed of a material that allows visible light incident on the lens member to totally pass and that totally reflects infrared light.

12. The electronic device of claim 11, wherein the processor is further configured to generate the second image information by removing a first image signal, which is detected by the camera while the light emitter is turned off, from a second image signal detected by the camera while the light emitter is turned on.

13. The electronic device of claim 10, wherein:
the reflective member applied to the lens member is formed of a material capable of reflecting both visible light and infrared light and is applied to only one region of the lens member, and
the camera is configured to generate third image information which comprises the first image information in a first region and the second image information in a second region.

14. The electronic device of claim 9, wherein:
an area of the lens member and an arrangement relationship between the lens member and the camera are adjusted such that a part of the visible light incident from the forward direction of the frame is directly incident on the camera, and
the camera is configured to generate third image information which comprises, in a first region, the first image information generated by receiving visible light directly incident on the camera, and comprises the second image information in a second region.

15. The electronic device of claim 9, wherein the reflective member applied to the lens member is formed of a material capable of partially reflecting infrared light incident on the lens member, and each of multiple pixels of an image sensor included in the camera comprises an RGB element configured to convert the received visible light into an electrical signal and an infrared light element configured to convert the received infrared light into an electrical signal.

16. The electronic device of claim 9, wherein, in order for infrared light reflected from the user's eye to be incident on the camera, the lens member is disposed to be inclined by a first angle with respect to a reference surface when the electronic device is viewed from a first direction, and the lens member is disposed to be inclined by a second angle with respect to the reference surface when the electronic device is viewed from a second direction perpendicular to the first direction.

17. The electronic device of claim 16, wherein the first angle is 10 degrees, and the second angle is 12 degrees.

18. The electronic device of claim 9, wherein the processor is further configured to control the display module to display an augmented reality (AR) image on the transparent member, to detect a direction of a user's gaze using the second image information, and to change, based on the direction of the user's gaze, a position of the AR image projected on the transparent member.

19. The electronic device of claim 18, wherein the processor is further configured to partially adjust, based on the direction of the user's gaze, a resolution of the AR image or a position of an object included in the AR image.

20. The electronic device of claim 18, wherein the processor is further configured to control at least a part of the AR image, based on the first image information.

* * * * *